United States Patent
Gnad

[15] 3,673,170
[45] June 27, 1972

[54] PHENYL-AZO-NAPHTHOL DYES

[72] Inventor: Gerhard Gnad, Ludwigshafen, Germany

[73] Assignee: Badische Anilin- & Soda-Fabrik Aktiengesellschaft, Ludwigshafen, Germany

[22] Filed: July 25, 1969

[21] Appl. No.: 845,055

[30] Foreign Application Priority Data

July 26, 1968 Germany.................P 17 93 039.1

[52] U.S. Cl. ..................260/202, 8/41 C, 260/152, 260/247.2 B, 260/326.3, 260/465 D, 260/471 R, 260/472

[51] Int. Cl. ...................C07c 107/06, C09b 29/10

[58] Field of Search..................................260/202

[56] References Cited

UNITED STATES PATENTS 2,791,513  5/1957  Siegel et al ............................106/289
3,499,886  3/1970  Mehltretter........................260/202 X

FOREIGN PATENTS OR APPLICATIONS 305,003   1/1955   Switzerland ..........................260/202
1,127,885 12/1956  France...................................260/202

*Primary Examiner*—Lewis Gotts
*Assistant Examiner*—C. F. Warren
*Attorney*—Johnston, Root, O'Keeffe, Keil, Thompson & Shurtleff

[57] ABSTRACT

Monoazo dyes having a 2-amino-5-nitrobenzoic ester as diazo component and $\beta$-naphthol as coupling component which are useful for dyeing linear polyesters and polyamides, said dyes being generally represented by the formula:

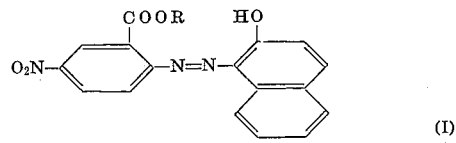

(I)

where R denotes the linear or branched aliphatic, araliphatic or cycloaliphatic radical of an alcohol.

2 Claims, No Drawings

PHENYL-AZO-NAPHTHOL DYES

The radical R may contain not only carbon and hydrogen but also heteroatoms, for example oxygen, sulfur, chlorine and bromine. These elements are present for example in substituents such as cyano, hydroxyl, keto, ester, amide, carboxyl, ether, thioether, sulfone, amino or aryloxy groups or heterocycles.

For example the radical R may be derived from the following compounds: methanol, ethanol, 1-propanol, 2-propanol, 1-butanol, 2-butanol, tert-butanol, tert-butyl carbinol, 2-ethylhexanol, allyl alcohol, cyclohexanol, benzyl alcohol, 1-phenylethanol, 2-phenylethanol, methyl glycol, ethyl glycol, β-chloroethyl glycol, propyl glycol, butyl glycol, phenyl glycol, glycol monoacetate, glycol monopropionate, methyl diglycol, ethyl diglycol, propyl diglycol, butyl diglycol, methyl triglycol, ethyl triglycol, propyl triglycol, glycol, diglycol, thiodiglycol, dipropylene glycol, triglycol, propanediol-1,2, propanediol-1,3, butanediol-1,4, pentanediol-1,5, hexanediol-1,6, 2-methylbutanediol-2,4, 2,2-dimethylpropanediol-1,3, 2-methyl-2-propylpropanediol-1,3, 2,2-diethylpropanediol-1,3, 2-ethyl-2-butylpropanediol-1,3, 2,2,4-trimethylpentanediol-1,3, 2-hydroxybutanediol-1,4, glycerol, hexahydroterephthalyl alcohol, β-hydroxyethyldimethylamine, 2-hydroxypropionitrile, 2-hydroxypropionamide, diacetone alcohol, N-(β-hydroxyethyl)-pyrrolidone or N-(β-hydroxyethyl)-morpholine.

In the case of polyfunctional alcohols, only one hydroxyl group is esterified.

Dyes which are preferred industrially have the general formula (Ia) or (Ib):

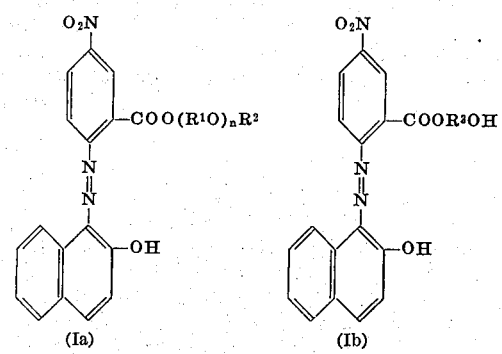

(Ia)    (Ib)

where $R^1$ denotes a linear or branched alkylene radical having two or three carbon atoms, $R^2$ denotes a hydrogen atom or a linear or branched alkyl radical having one to four carbon atoms or an acetyl group or propionyl group, $R^3$ denotes a linear or branched alkyl radical having four to ten carbon atoms and $n$ denotes one of the integers from 1 to 6.

Among the dyes having the said formulas, those are particularly valuable in which the carboxyl group is esterified with an alkyl glycol or alkyl polyglycol having a total of three to ten carbon atoms.

The new dyes having the formula (I) may be prepared by coupling diazo compounds of amines having the general formula (II):

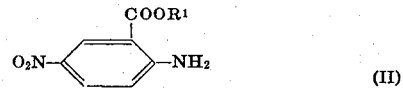

(II)

where $R^1$ has the above meanings with 2-hydroxynaphthalene.

Diazotization may be carried out in aqueous hydrochloric acid alone or with the addition of dispersing agents depending on the solubility of the diazo component. Sometimes an addition of organic solvents such as alcohols, glacial acetic acid, acetone or dimethylformamide is advantageous. In the latter case the diazo component is advantageously first dissolved in the organic solvent and the acid then added. Diazotization is also possible in concentrated sulfuric acid provided the amines having the formula (II) do not have any free hydroxyl groups.

The new dyes are suitable for dyeing synthetic fibrous material, particularly of polyamides and polyesters. They may be used singly or mixed together. Dyeings obtained are distinguished particularly by excellent fastness to light and to dry-heat pleating and setting. The use of mixtures, obtained for example starting from mixtures of amines having the formula (II), is particularly advantageous.

The invention is illustrated by the following Examples in which parts and percentages are by weight unless otherwise stated.

EXAMPLE 1

22.6 parts of 2-amino-5-nitrobenzoic acid β-hydroxyethyl ester is stirred at room temperature with 300 parts by volume of water and 0.3 part of the reaction product of oleylamine with about 12 moles of ethylene oxide for several hours. 25 parts by volume of concentrated hydrochloric acid and 300 parts by volume of ice are added and 30 parts by volume of 23 percent sodium nitrite solution is allowed to flow in slowly at 0° to 5° C. The whole is stirred for another two hours at the said temperature and then any excess of nitrous acid presend is removed by adding sulfamic acid. After filtration, the diazo solution is allowed to flow gradually into a solution of 14.8 parts of 2-hydroxynaphthalene, 5 parts of sodium hydroxide and 10 parts of sodium carbonate in 300 parts by volume of water with an addition of 300 parts of ice. When coupling is completed the deposited dye is suction filtered, washed with water and dried. It is obtained in the form of an orange powder which dissolves in dimethylformamide with a golden yellow color. The dye has the formula:

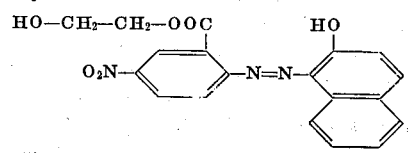

100 parts of polyethylene terephthalate cloth is dyed for 60 minutes at 125° C in a pressure apparatus in a dye liquor which contains 1 part of the finely divided dye from Example 1, 2 parts of the sulfonated adduct of 80 moles of ethylene oxide to 1 mole of sperm oil alcohol and 2,000 parts of water. A pure orange dyeing is obtained which has outstanding thermal resistance and very good light fastness.

By a method analogous to that described, orange dyes having similar tinctorial properties are obtained using the diazo components given in the following Table and 2-hydroxynaphthalene:

| Example | Diazo component |
|---|---|
| — | $O_2N-\langle\rangle-NH_2$, COOCH$_2$CH$_2$OCH$_2$CH$_2$OH |
| 3 ........ 1:1 mixture | $O_2N-\langle\rangle-NH_2$, COOCH$_2$CH$_2$OH and $O_2N-\langle\rangle-NH_2$, COOCH$_2$CH$_2$OCH$_2$CH$_2$OH |
| 4 ........ | $O_2N-\langle\rangle-NH_2$, COOCH$_2$CH$_2$OCH$_2$CH$_2$OH |
| 5 ........ | $O_2N-\langle\rangle-NH_2$, COOCH$_2$CH$_2$N(CH$_3$)$_2$ |
| 6 ........ | $O_2N-\langle\rangle-NH_2$, COOCH$_2$CH$_2$N$\langle\rangle$O |

EXAMPLE 7

26.8 parts of 2-amino-5-nitrobenzoic acid β-acetoxyethyl ester is dissolved in 300 parts by volume of dimethylformamide and at 0° to 5° C 30 parts by volume of concentrated hydrochloric acid is added. At the same temperature 30 parts by volume of 23 percent sodium nitrile solution is slowly run in and the whole is stirred for another 2 hours. Coupling is then carried out in the manner described in Example 1 with 14.8 parts of 2-hydroxynaphthalene. An orange dye is formed which dissolves in dimethylformamide with a golden yellow color and dyes polyethylene terephthalate cloth orange shades having excellent fastness.

Dyes having similar fastness properties are obtained in an analogous manner with the diazo components set out in the Table and 2-hydroxynaphthalene as coupling component.

| Example | Diazo component |
|---|---|
| 8 | $O_2N-C_6H_3(NH_2)-COOCH_2CH_2OCH_2CH_2OCH_3$ |
| 9 | $O_2N-C_6H_3(NH_2)-COOCH_2CH_2OCH_2CH_2OC_2H_5$ |
| 10 | $O_2N-C_6H_3(NH_2)-COOCH_2CH_2OCH_2CH_2OC_3H_7$ |
| 11 | $O_2N-C_6H_3(NH_2)-COOCH_2CH_2OCH_2CH_2OC_4H_9$ |
| 12 | $O_2N-C_6H_3(NH_2)-COO(CH_2)_4OH$ |
| 13 | $O_2N-C_6H_3(NH_2)-COO(CH_2)_6OH$ |
| 14 | $O_2N-C_6H_3(NH_2)-COOCH_2C(CH_3)_2CH_2OH$ |
| 15 | $O_2N-C_6H_3(NH_2)-COOCH_2CH(OH)CH_2OH$ |
| 16 | $O_2N-C_6H_3(NH_2)-COOCH_2CH_2CN$ |
| 17 | $O_2N-C_6H_3(NH_2)-COO-C_6H_{11}$ |
| 18 | $O_2N-C_6H_3(NH_2)-COOCH_2CH_2O-C_6H_5$ |
| 19 | $O_2N-C_6H_3(NH_2)-COOCH_2CH_2N(morpholino)$ |

EXAMPLE 20

32.8 parts of the compound having the formula:

$$O_2N-C_6H_3(NH_2)-COO(CH_2CH_2O)_3CH_3$$

is introduced into 50 parts of 75 percent sulfuric acid at a temperature of from 35° to 40° C while stirring and then cooled to 10° to 12° C. 35 parts of nitrosylsulfuric acid is slowly added to the solution. The whole is stirred for another 20 minutes and the solution is then allowed to flow into 200 parts of ice to which 0.5 part of the reaction product of oleylamine and about 12 moles of ethylene oxide have been added. The whole is stirred for another 15 minutes, any excess of nitrite present is destroyed as usual and the diazo solution is added slowly to a solution of 14.8 parts of 2-hydroxynaphthalene in 200 parts of water. The temperature of the coupling mixture is held at from 0° to 5° C by adding 500 parts of ice. When coupling is completed, the deposited dye is suction filtered, washed and dried. A red dye is obtained which dissolves in acetone with an orange color and gives orange dyeings having excellent light and sublimation fastness on knitted material of polyethylene terephthalate.

Other dyes having similar properties are obtained by using the compounds set out in the following Table as diazo components instead of the diazo component used in Example 20.

| Example | Diazo component |
|---|---|
| 21 | $O_2N-C_6H_3(NH_2)-COOCH_2CH_2OCH_2CH_2OCH_2CH_2OC_2H_5$ |
| 22 | $O_2N-C_6H_3(NH_2)-COOCH_2CH_2OCH_2CH_2OCH_2CH_2OC_3H_7$ |
| 23 | $O_2N-C_6H_3(NH_2)-COOCH_2CH_2OCH_2CH_2OCH_2CH_2OC_4H_9$ |
| 24 | $O_2N-C_6H_3(NH_2)-COOCH_2CH_2Cl$ |
| 25 | $O_2N-C_6H_3(NH_2)-COOCH_2CH_2OCH_2CH_2Cl$ |

In dyeing with a mixture of the dyes from Examples 13 and 20, for example 100 parts of polyethylene terephthalate is treated for 90 minutes at a temperature of 100° C in a dye liquor which consists of 3,000 parts of water, 9 parts of finely divided o-phenylphenol and 0.3 part of a mixture of equal parts of the dyes from Example 10 and Example 11. The orange cloth is washed with water and then treated for fifteen minutes at 35° C in a liquor which consists of 3,000 parts of water, 3 parts of sodium dithionite and 3 parts of 32 percent caustic soda solution and dried.

EXAMPLE 26

30 parts by volume of 23 percent aqueous sodium nitrite solution is allowed to flow slowly at 3° to 8° while stirring into a solution of 24 parts of 2-amino-5-nitrobenzoic β-methoxyethyl ester in 300 parts by volume of glacial acetic acid and 25 parts by volume of concentrated hydrochloric acid. During addition of the sodium nitrite solution, a little ice is added continually. The solution freed from excess nitrous acid by adding sulfamic acid is slowly added to a solution of 14.8 parts of 2-hydroxynaphthalene in 10 parts of 50 percent caustic soda solution and 300 parts by volume of water, a pH value of from 7 to 8 being maintained by the simultaneous addition of 50 percent caustic soda solution and a temperature of 0° to 5° C being maintained in the solution by gradual addition of 1,000 parts of ice. After the whole has been stirred overnight the coupling product is suction filtered, washed with water and dried. A pale red powder is obtained which dissolves in acetone with an orange color and gives full orange dyeings having very good fastness properties on fibers of polyester material.

Orange dyes having similar tinctorial properties are obtained from the diazo components in the following Table and 2-hydroxynaphthalene by a method analogous to the said method:

| Example | Diazo component |
| --- | --- |
| 27 | $O_2N-C_6H_3(COOCH_2CH_2OCH_2CH_2OCH_2CH_2OH)-NH_2$ |
| 28 | $O_2N-C_6H_3(COOCH_2-CH(OH)-CH_3)-NH_2$ |
| 29 | $O_2N-C_6H_3(COOCH_2-C(CH_3)_2-CHOH-CH(CH_3)-CH_3)-NH_2$ |
| 30 | $O_2N-C_6H_3(COO-CH_2-C(CH_3)_2-CH_2OH)-NH_2$ |
| 31 | $O_2N-C_6H_3(COOCH_2-C(CH_3)_2-CH_2OH)-NH_2$ |
| 32 | $O_2N-C_6H_3(COOCH_2-CH(CH_3)-O-CH_2CH(OH)-CH_3)-NH_2$ and $O_2N-C_6H_3(COOCH(CH_3)-O-CH(CH_3)-CH_2OH)-NH_2$ |
| 33 | $O_2N-C_6H_3(COOCH_3)-NH_2$ |
| 34 | $O_2N-C_6H_3(COOC_2H_5)-NH_2$ |
| 35 | $O_2N-C_6H_3(COOC_3H_7(n))-NH_2$ |
| 36 | $O_2N-C_6H_3(COOC_3H_7(i))-NH_2$ |
| 37 | $O_2N-C_6H_3(COOC_4H_9(n))-NH_2$ |
| 38 | $O_2N-C_6H_3(COOC_4H_9(i))-NH_2$ |
| 39 | $O_2N-C_6H_3(COOCH_2CH(C_2H_5)(CH_2)_3CH_3)-NH_2$ |
| 40 | $O_2N-C_6H_3(COOCH_2-CH=CH_2)-NH_2$ |
| 41 | $O_2N-C_6H_3(COOCH_2CH_2-S-CH_2CH_2OH)-NH_2$ |
| 42 | $O_2N-C_6H_3(COOCH_2C(C_2H_5)(C_4H_9)-CH_2OH)-NH_2$ |
| 43 | $O_2N-C_6H_3(COOCH(CH_3)COOH)-NH_2$ |
| 44 | $O_2N-C_6H_3(COOCH(CH_3)COOC_2H_5)-NH_2$ |
| 45 | $O_2N-C_6H_3(COO(CH_2CH_2O)_4C_2H_5)-NH_2$ |
| 46 | $O_2N-C_6H_3(COO(CH_2CH_2O)_zC_2H_5)-NH_2$ Mixture of: 4 parts of the compound with Z=3, 5 parts of the compound with Z=4 and 1 part of the compound with Z=5 |
| 47 | $O_2N-C_6H_3(COOCH_2-C_6H_5)-NH_2$ |

I claim:
1. A monoazo dye of the formula

wherein
R is alkyl of one to eight carbon atoms, allyl, hydroxyalkyl of four to 10 carbon atoms, β-phenoxyethyl, β-cyanoethyl, β-chloroethyl, cyclohexyl, benzyl, phenylethyl, β-dimethylaminoethyl or one of the radicals of the formula $(R^1-O)_n R^2$, $-CH_2CH_2OCH_2CH_2Cl$, $-CH_2CH_2SCH_2CH_2OH$, $-CH-COOH$ or $-CHCOOC_2H_5$
$\phantom{-C}|$ $\phantom{-CHCOOC_2}|$
$\phantom{-C}CH_3$ $\phantom{-CHCOOC_2}CH_3$ $R^1$ being linear or branched alkylene of two or three carbon atoms,
$R^2$ being hydrogen, alkyl of one to four carbon atoms, acetyl or propionyl and
n being one of the integers 1 to 3.

2. A monoazo dye devoid of sulfonic acid groups and having the formula:
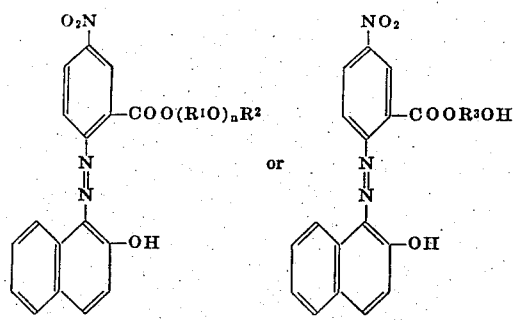
where $R^1$ is linear or branched alkylene of two or three carbon atoms, $R^2$ is hydrogen or alkyl of one to four carbon atoms, $R^3$ is linear or branched alkylene of four to ten carbon atoms and n is one of the integers 1 to 3.
* * * * *

PO-1050
(5/69)

UNITED STATES PATENT OFFICE
CERTIFICATE OF CORRECTION

Patent No. 3,673,170           Dated June 27, 1972

Inventor(s) Gerhard Gnad

It is certified that error appears in the above-identified patent and that said Letters Patent are hereby corrected as shown below:

Column 2, line 51, in the table, under "Example" insert -- 2 --.

Column 3, in the table, Example 19, that portion of the formula reading "  " should read --  --; line 20, under "Example", insert -- 28........ --; Example 30, that portion of the formula reading "$CH_2-C$ $\,|\,$ $CH_3$" should read -- $CH_2-C$ $\,|\,$ $CH_3$ --;

lines 40 to 47, insert --

32    1:1 mixture of {

--.

Signed and sealed this 12th day of December 1972.

(SEAL)
Attest:

EDWARD M. FLETCHER, JR.
Attesting Officer

ROBERT GOTTSCHALK
Commissioner of Patents